United States Patent [19]
McKay et al.

[11] Patent Number: 5,056,596
[45] Date of Patent: Oct. 15, 1991

[54] RECOVERY OF BITUMEN OR HEAVY OIL IN SITU BY INJECTION OF HOT WATER OF LOW QUALITY STEAM PLUS CAUSTIC AND CARBON DIOXIDE

[75] Inventors: Alexander S. McKay, Las Vegas, Nev.; Tawfik N. Nasr, Edmonton, Canada

[73] Assignee: Alberta Oil Sands Technology and Research Authority, Edmonton, Canada

[21] Appl. No.: 534,352

[22] Filed: Jun. 7, 1990

Related U.S. Application Data

[63] Continuation of Ser. No. 229,008, Aug. 5, 1988, abandoned.

[51] Int. Cl.$^5$ .................... E21B 43/22; E21B 43/24
[52] U.S. Cl. .................... 166/272; 166/271; 166/273; 166/274
[58] Field of Search .................... 166/271–274, 166/303

[56] References Cited

U.S. PATENT DOCUMENTS

| | | | |
|---|---|---|---|
| 1,249,232 | 12/1917 | Squires | 166/272 X |
| 3,279,538 | 10/1966 | Doscher | 166/303 |
| 3,687,197 | 8/1972 | Redford | 166/272 |
| 3,880,237 | 4/1975 | Snavely, Jr. | 166/303 |
| 4,057,106 | 11/1977 | Clingman | 166/303 X |
| 4,099,568 | 7/1978 | Allen | 166/272 X |
| 4,271,905 | 6/1981 | Redford et al. | 166/272 X |
| 4,393,937 | 7/1983 | Dilgren et al. | 166/272 |
| 4,488,598 | 12/1984 | Duerksen | 166/272 X |
| 4,516,636 | 5/1985 | Doscher | 166/272 |
| 4,610,304 | 9/1986 | Doscher | 166/272 X |
| 4,660,641 | 4/1987 | Shen | 166/272 |
| 4,678,039 | 7/1987 | Rivas et al. | 166/303 |
| 4,702,317 | 10/1987 | Shen | 166/272 |

Primary Examiner—George A. Suchfield
Attorney, Agent, or Firm—Cooper & Dunham

[57] ABSTRACT

Laboratory coreflood experiments were conducted on Athabasca oil sands using hot water and caustic or carbon dioxide. Production temperatures were maintained at 150° C. or lower and at an injection pressure of 3.55 MPa (500 psi). The objective of the experiments was to determine the conditions under which oil-in-water (O/W) emulsion could be produced in-situ. In addition, the study was to investigate the potential benefit of adding carbon dioxide to hot water to improve bitumen recovery.

The results prove that when the pH of injected fluids is between 10.5 and 11.5, the O/W emulsion predominates. The emulsion is stable and has a viscosity much lower than that of the oil itself, due to the continuous water phase, and should beneficial in the recovery of heavy oil and bitumen. When the injected fluids have a pH less than 10.5, the water-in-oil (W/O) emulsion predominates. The laboratory data indicate that even this type of emulsion behaves as an O/W in the core but it is unstable and when produced the droplets quickly coalesce and immediately form the observed W/O emulsion.

The addition of carbon dioxide to hot water at low temperatures proved to be effective in improving bitumen recovery over that from hot water alone. This is believed to be due to the effect of carbon dioxide absorption in reducing bitumen viscosity which resulted in improved bitumen mobilization. Another beneficial effect is the increase in pressure gradient due to the presence of free carbon dioxide, beyond the solubility limit, in the injected stream. The hot water-$CO_2$ runs produces mostly W/O emulsion. The best recovery was achieved when the produced fluids temperatures was around 130° C.

8 Claims, 8 Drawing Sheets

Hot Water-$CO_2$ (1.2 mole %) Process Variables Versus Pore Volumes Injected.

Effect of injected Fluids pH on Bitumen Recovery.

FIG. 2

Formation of Oil-In-Water Emulsions for An Injected Fluid pH of 10.5 and A A Temperature of 165°C.

FIG. 3

Formations of Oil-In-Water Emulsions for An Injected Fluid pH of 11.5 and A Temperature of 140°C

FIG. 4

Hot Water-Caustic Process Variables Versus Pore Volumes Injected- pH=11.5.

FIG. 5

Comparison of Percent Recovery Versus Pore Volumes Injected for Hot Water Only and Hot Water-$CO_2$ at 125°C.

FIG. 6

Hot Water-$CO_2$ (1.2 mole %) Process Variables Versus Pore Volumes Injected.

FIG. 7

Hot Water-$CO_2$ (1.2-3.0 moles %) Process Variables Versus Pore Volumes Injected.

FIG. 8

RECOVERY OF BITUMEN OR HEAVY OIL IN SITU BY INJECTION OF HOT WATER OF LOW QUALITY STEAM PLUS CAUSTIC AND CARBON DIOXIDE

This is a continuation of application Ser. No. 229,008, filed Aug. 5, 1988, now abandoned.

This application is related to copending patent application Ser. No. 152933 filed Feb. 5, 1988, now U.S. Pat. No. 4,846,275 entitled Recovery of Heavy Crude Oil or Tar Sand Oil or Bitumen from Underground Formations in the name of Alex S. Mckay, one of the applicants herein.

BACKGROUND OF THE INVENTION

While most Athabasca bitumen is produced as either oil-in-water (0/W) or water-in-oil (W/0) emulsion there has been no general recognition that these emulsions are formed in the reservoir and can play a significant role in the recovery processes.

In a recent publication, M. Sarbar in an article entitled "The Effect of Chemical Additives on the Stability of Oil-in-Water Emulsion Flow through Porous Media", *Paper No.* 87-38-25, *38th Annual Technical Meeting of the Petroleum Society of CIM*, Calgary, Alberta, Canada, June 7-10, 1987, reported that while the Texaco Pilot in Athabasca, Alberta produced mostly O/W emulsion, they had no proof that it was generated in the reservoir. However, their laboratory studies showed that it was possible to transport a synthetic crude O/W emulsion through a sand pack. Other oil sands pilots produce mostly W/O emulsion which suggests that this emulsion is not generated in the reservoir because of the high viscosity.

In a previous investigation, T. N. Nasr et al in an article entitled "The Use of $CO_2$ with Steam in Bitumen Recovery from Oil Sand-Effect of Injection Strategies", *Proc. of the WRI/DOE Tar Sand Symposium*, Vail, Colo., U.S.A., June 26-29, 1984, has demonstrated that carbon dioxide plus steam improved oil recovery from Athabasca oil sands over that from steam alone. From that investigation, it became evident that a significant amount of bitumen could be recovered from the hot water-$CO_2$ in the reservoir at temperatures less than the steam temperature, and a hot water- $CO_2$ process could be viable in the recovery of heavy oil and bitumen. The process could have both lower capital and operating costs.

The practices of this invention and its advantages are illustrated in the accompanying drawings wherein.

BRIEF DESCRIPTION OF THE INVENTION

The present investigation is based on the assumption that emulsions are formed in the reservoir and are important factors in the bitumen recovery processes. This assumption is substantiated by the experimental results.

In addition, the object of this invention as to demonstrate improved hot water bitumen recovery by using additives for in-situ recovery of bitumen. The invention determined the bitumen recovery processes employing hot water-caustic and hot water-$CO_2$ merit further development and optimization, particularly with production temperatures between approximately 150° C. and 100° C.

DETAILED DESCRIPTION OF THE DRAWINGS

The experiments were designed to use Athabasca oil sands which were obtained from the Suncor mine in Fort McMurray, Alberta. To establish an initial injectivity, a clean communication path of the same permeability as that of the oil sand was used. This was to simulate the field situation where natural communication through a low bitumen saturation oil sand zone exists. Constant rate of water injection was used and no pressure drawdown cycles were introduced. This was to simulate a hot water-additives flooding or injection process. An injection pressure of 3.5 MPa (500 psi) was employed. A special data collection system was designed to continuously monitor the pressure drop across the core and allow production fluids to be collected under high pressures. The produced emulsion and oil cut were determined using standard analytical methods.

In the experiments neutral pH water was injected initially to establish hot communication between the injection and production wells. This was to avoid rapid mobilization of the bitumen which would result in plugging and a premature termination of the process. Once hot communication was established between the wells additives were added to the hot water.

In the tests a deformable lead core sleeve of about 9 cm ID, 39 cm in length and 0.16 cm wall thickness, was used to contain the oil sand pack. The effective length of the oil sand pack was about 30.5 cm. The deformable walls allowed for compression of the test pack under overburden pressure.

Previously frozen Athabasca oil sand was first thawed and then packed into the lead sleeve using a pneumatic tamper. A small amount of oil sand, 200 grams, was packed at a time. In total, about 4 kg of oil sand was packed into the core. A packing density of about 1.9 gm/cc, without the overburden pressure, was obtained. After the application of overburden pressure this density was close to 2 gm/cc. The core was then frozen before drilling a communication path of 1 cm diameter along the axis of the core. The communication path was filled with clean frac sand which has the same permeability, 3 $\mu m^2$, as the oil sands and then flooded with cold distilled water . A 0.32 cm thick felt metal screen was used on the inner surface of the production end cap to avoid sand production during a run. A leak test was performed using a helium leak detector.

Figure 1:
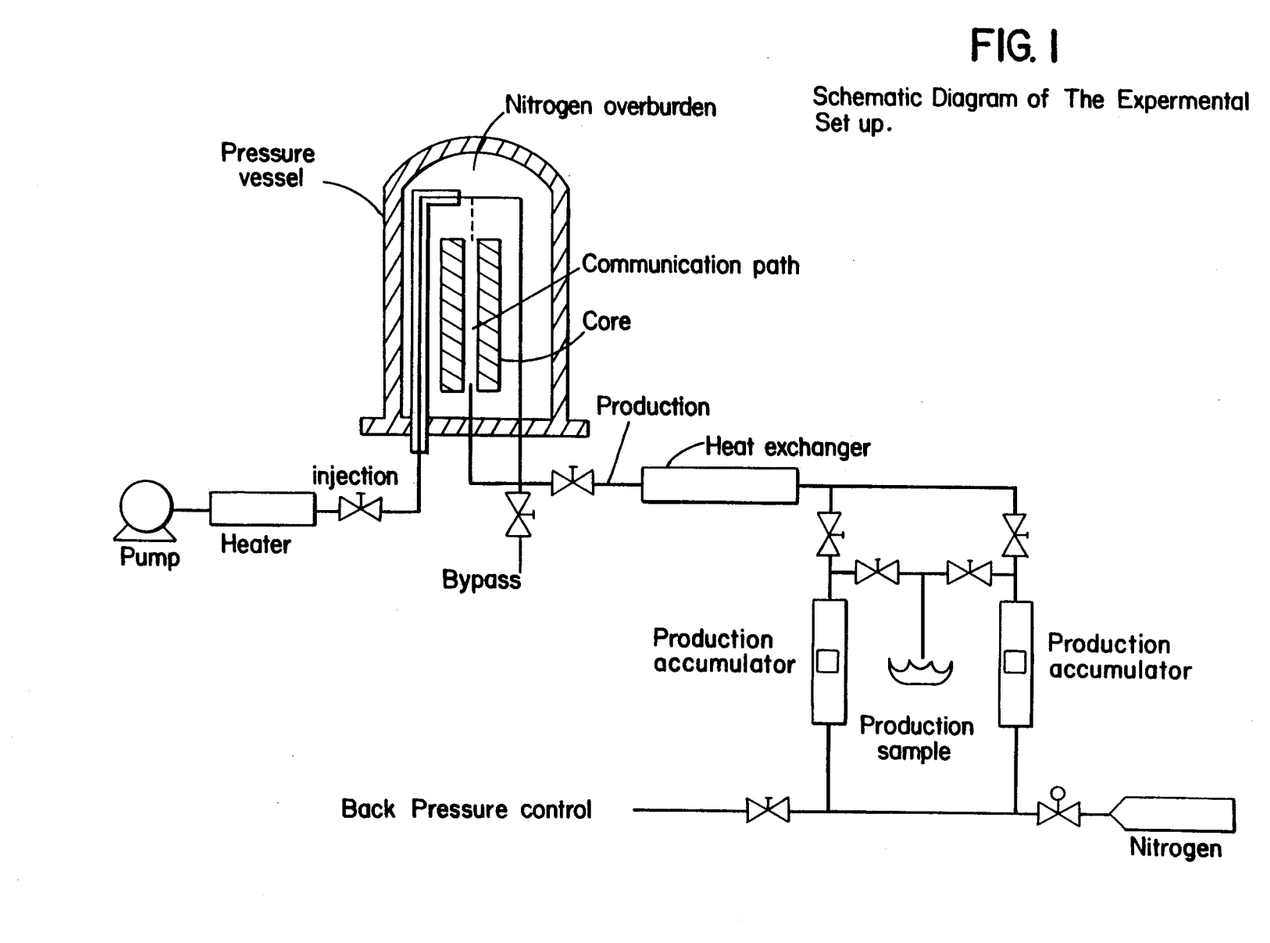
FIG. 1 schematically illustrates a experimental, laboratory apparatus for the practices of this invention.

A schematic diagram of the experimental setup is shown in FIG. 1. A constant water injection rate was supplied by a Tracor 951 positive displacement pump. A computer-controlled 4 kW variable power electric immersion heater was used to heat the water to the desired temperature. Before injecting hot water into the core, a bypass line with a controlled back pressure system was used until the desired temperature was reached An overburden pressure of 5 MPa was applied using pressurized nitrogen from a pressure regulated nitrogen supply. A pressure differential transmitter was used to measure the pressure drop across the core.

The production stream passed through a 0.64 cm diameter heater traced production tubing and was directed, alternately, into one of two floating piston production accumulators operated at high pressures. A constant nitrogen gas bleed and back pressure regulators were used to maintain the back pressure on the accumulators. Production samples were collected in two-liter glass jars at half hour intervals for subsequent lab analysis. A pressurized gas cylinder and a Hastings Linear Mass Flowmeter was used to measure the injected gas flow rate. The injected gas and hot water were mixed before injection into the core.

The Hot Water-Caustic Process

The mechanisms by which chemical additives enhance oil recovery by lowering the interfacial tension between oil and water, which result in spontaneous emulsification of the oil, changing the wettability of reservoir rocks and improving sweep efficiency have been reviewed, see C.E. Johnson, Jr. "Status of Caustic and Emulsion Methods", *J. Pet. Tech.*, June 1976, pp 85-92, and C.E. Cooke, Jr. et al "Oil Recovery by Alkaline Waterflooding", *J. Pet. Tech.*, Dec. 1974, pp. 1365-1374. Each mechanism requires different conditions regarding the oil, rock and injected fluid properties.

Emulsification and entrainment involves in-situ emulsification of the oil and its entrainment into a continuous flowing alkaline water phase. The formation of O/W emulsion is due to lowering interfacial tensions, particularly for oils which contain enough acidic components to form, in-situ, natural surfactants with the caustic.

Five experiments were conducted at different injection water pH and temperature to investigate the possibility of forming O/W emulsion under in-situ conditions and the potential benefit of adding caustic to hot water to improve bitumen recovery. A summary of test run conditions is shown in Table 1.

TABLE 1

Summary of The Hot Water-Caustic Experiments

| Prod. Temp. °C. | pH | Weight of Oil Sand (gm) | Pre-Run analysis wt. % Bit. | Pre-Run analysis wt. % Water | Pre-Run analysis wt. % Sand | Packing Density (gm/cc) | % Rec. |
|---|---|---|---|---|---|---|---|
| 115 | 7.0 | 3790.0 | 14.1 | 1.3 | 83.8 | 1.9 | 27 |
| 125 | 13.3 | 3897.9 | 13.7 | 1.5 | 84.0 | 1.9 | 52 |
| 170 | 10.5 | 3980.5 | 13.8 | 1.3 | 84.2 | 1.9 | 55 |
| 140 | 11.5 | 3999.3 | 14.3 | 1.2 | 84.2 | 1.9 | 49 |
| 100 | 11.5 | 3989.0 | 14.8 | 1.0 | 83.9 | 1.8 | 35 |

Figure 2:
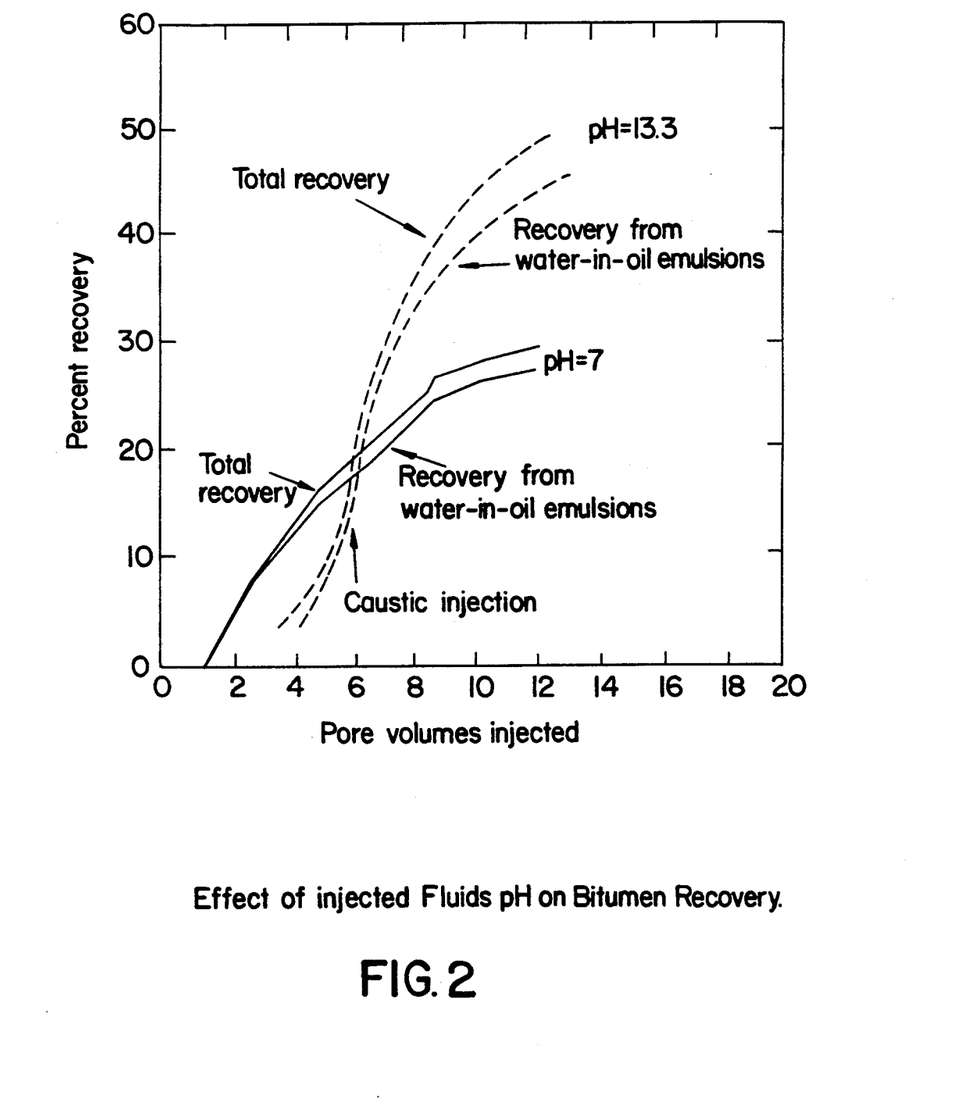
FIGS. 2, 3 and 4 illustrate the effect of injected fluid pH on bitumen recovery in the practices of this invention.

A comparison of the total bitumen in production samples and the bitumen from the W/O emulsion for a neutral pH water injection in shown in FIG. 2. Total percent recovery is the total bitumen recovered from both O/W and W/O emulsions as percent of the initial bitumen in place. This figure indicates that most of the bitumen was recovered in the form of W/O emulsion; there is essentially no separation between the two curves. The dispersed bitumen droplets in the water phase, O/W emulsion, had an average diameter of about 3 $\mu$m. This is smaller than the average pore throat diameter of the porous medium. The pH of the produced P/W emulsion was about the same as that of the injected water. The rate of oil recovery during the run was quite low and after the injection of about 13 pore volumes (PV), 30% of the bitumen in place had been produced at an average production temperature of about 100° C. Because of the constant hot water injection flow rate the water injection temperature was always approximately 30° C. higher than the production temperature.

The effect of increasing the pH to 13.3 on recovery is shown in FIG. 2. Water at neutral PH was injected for the first 6 PV of the run. At the end of this injection period, 10% of the initial bitumen had been recovered. No bitumen was recovered during the first 3 PV of water injected as the communication path was being heated and bitumen mobilized. After 6 PV had been injected, caustic was added to the injection stream to obtain an injection water pH of 13.3. Introducing the caustic into the core resulted in an improvement of the rate and ultimate recovery. After the injection of a total of 14 PV, a recovery of 51% of the initial bitumen was obtained. When the caustic injection started, an increase in pressure drop from 60 to 80 kPa was noticed. This increase lasted only for a short period of time, one half PV of water injection, and started to decline again. The increase in pressure drop was a result of increased oil cut in the produced water form 1.5% to 7.6%.

The production was in the form of W/O emulsion as can be seen in FIG. 2. The first production sample after caustic injection contained a large amount of W/O emulsion. This resulted in an increase in pressure drop and rapid increase in the rate of oil recovery. The W/O emulsion continued to be produced until the end of the run. The pH of produced fluids stayed at relatively the same value as the injected water pH and there was no indication of pH loss during the experiment. However, there was an indication of sand dissolution because of the high silica content in the produced water. The high pH of the injected water prevented the formation of O/W emulsion. The small amount of bitumen produced in the form of O/W emulsion had very small droplet diameters, less than 1 $\mu$m.

Figure 3:
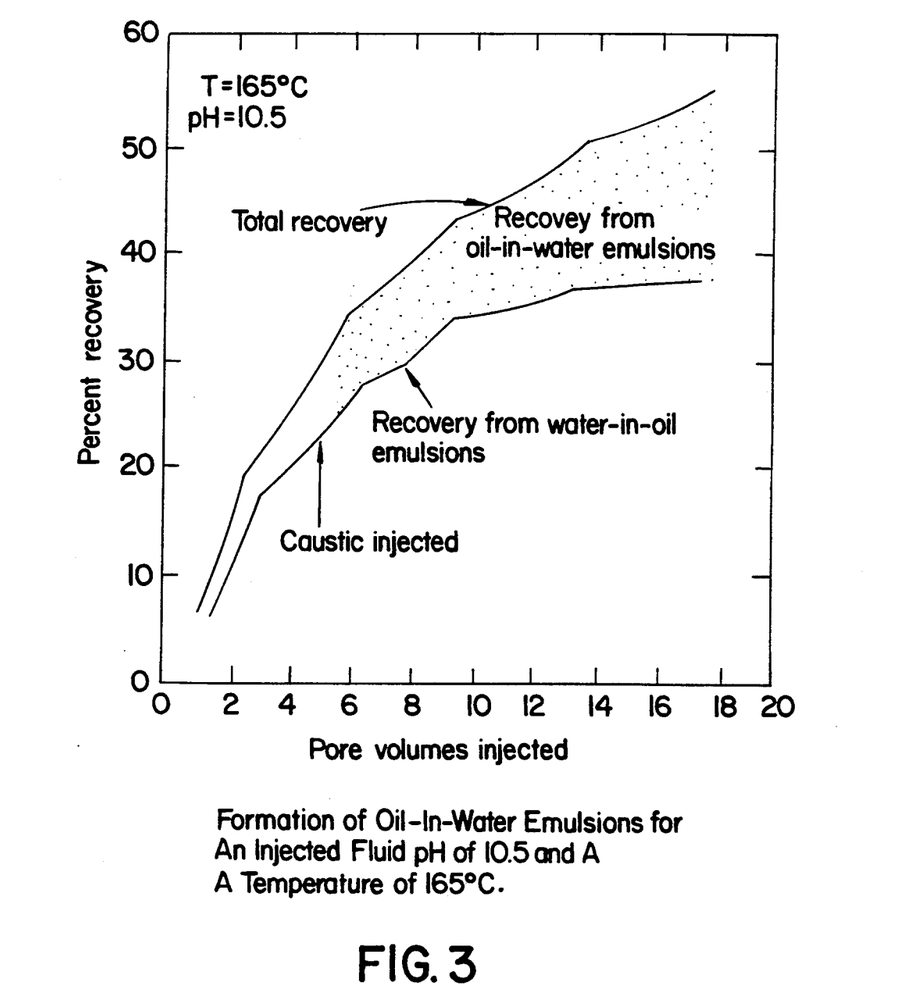

It was decided to increase the injection water temperature so that the production temperature would be around 160° C. and use an injection water pH of 10.5 to promote the formation of O/W emulsion. The run was started by injecting neutral pH water for the first 5 PV until the communication path was hot enough and the pressure drop across the core decreased to a level which would allow increase in the pressure drop without plugging when the additive was introduced. The process variables are shown in FIG. 3. A high bitumen recovery was obtained from this run, 55% of the initial bitumen in place after the injection of 18 PV. The production temperature varied between 175° C. and 140° C. When the caustic was injected in the cored there was no clear indication of an increase in pressure drop. By the end of the run, the pressure drop across the core was at a low value of 30 kPa.

Initially, before the caustic was injected, most of the recovered bitumen was in the form of W/O emulsion. When caustic injection started, the formation of O/W emulsion became clear in the production fluids and the bitumen in this emulsion accounted for more than 40% of the total bitumen produced. The pH of the produced fluids was lower than that of the injected water, 8.5 for production fluids versus 10.5 for injection fluids. The loss of pH continued throughout the run. This loss was the result of the very low caustic concentration in the injected water, about 13 ppm.

Figure 4:
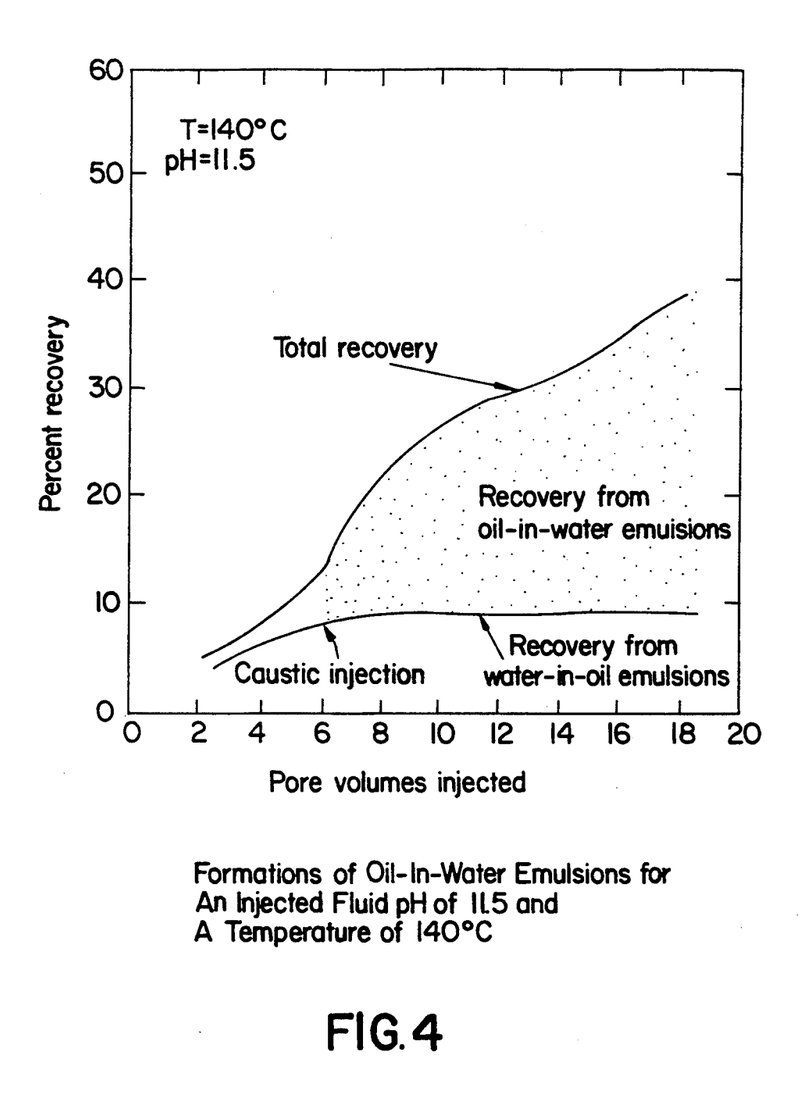

Enhancement of the emulsification process by increasing the pH from 10.5 to 11.5 is shown in FIG. 4. The caustic was injected after the injection of 6 PV of a neutral pH water. Injection of the caustic resulted in an improvement in the rate of recovery. After the injection of 19 PV, about 40% of the initial bitumen had been produced. The total bitumen in production samples is compared to the bitumen had been produced. The total bitumen in production samples is compared to the bitumen from the W/O emulsion in FIG. 4. Prior to the caustic injection, most of the recovered bitumen was in the form of W/O emulsion. When the caustic was injected, more than 90% of the recovered bitumen was in the form of O/W emulsion. After 2.5 PV of caustic injection, the pH of produced fluids started to increase steadily until it reached the injection water pH of 11.5 by the end of the run. A gradual increase in the pressure drop from 90 kPa to 130 kPa when the Caustic was injected in the core was noticed.

Figure 5:
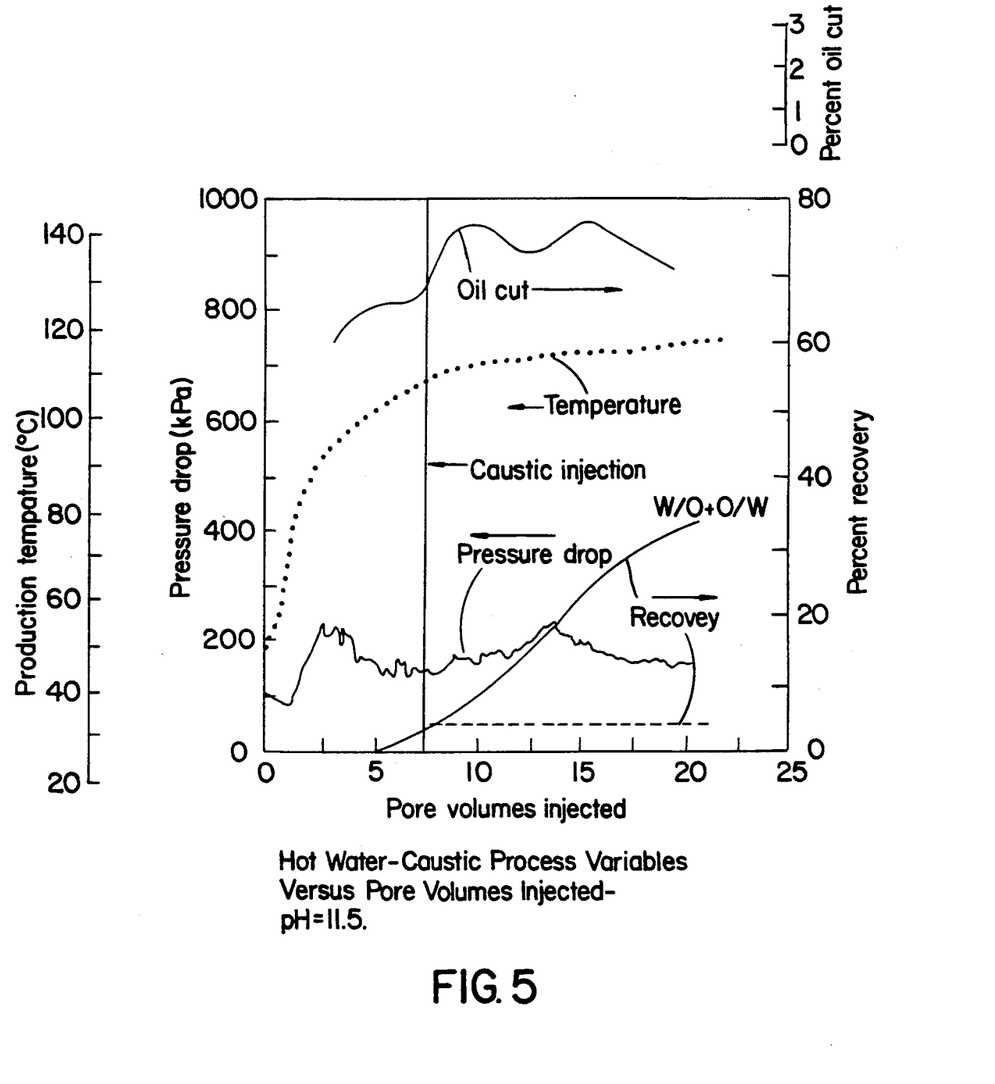
FIGS. 5 and 6 graphically illustrate the effects of certain process variables in the practices of this invention.

The above experiments, show that at a production temperature of about 140° C. and a pH of 11.5 more than 90% of the produced bitumen was in the form of O/W emulsion. An experiment was carried out to examine the formation of O/W emulsion at a lower production temperature of 100° C. and keeping the pH level at 11.5. FIG. 5 displays the process variables versus PV injected. The oil cut is defined as the ratio of the total weight of bitumen produced to fluid produced. Neutral pH water was injected for 7.5 PV. During the first 3.8 PV of hot water injection, the communication path was being heated and bitumen was displaced into it. The pressure drop across the core and production temperature were increasing and no bitumen was being produced. When the production temperature reached about 90° C., bitumen started to be produced at a low rate (an oil cut of about 1%) and the pressure drop across the core declined gradually from 200 kPa to about 160 kPa. A the end of neutral pH water injection, 5% of the initial bitumen was recovered in the form of W/O emulsion. At 7.5 PV into the run, caustic injection started at a pH of 11.5. A gradual increase in the oil cut (from 1% to about 2.5%) and the pressure drop was noticed. The production temperature was essentially constant at 105° C. With caustic injection, the produced bitumen was in the form of O/W emulsion. The oil cut remained at about 2% until 7.5 PV of hot water-caustic had been injected and then started to decline gradually. The pressure drop across the core decline at the same manner as the oil cut after 15 PV. This run produced a total recovery of about 33% of the initial bitumen in place and proved that O/W emulsion was forming inside the core at a pH of 11.5 and a production temperature as low as 100° C. The advantages of forming an O/W emulsion in-situ is that bitumen can be produced at a relatively low pressure gradient and at a relatively low temperature.

The Hot Water-CO$_2$ Process

Generally speaking, the effect of carbon dioxide on oil depends on a number of mechanisms related to the phase behavior of CO$_2$-oil mixtures. It is dependant on temperature and pressure. When carbon dioxide is dissolved in bitumen, the viscosity of bitumen is drastically reduced. The higher the initial bitumen viscosity, the greater the percentage reduction takes place upon carbonation of bitumen. The solubility of carbon dioxide in bitumen also cases bitumen to swell. When bitumen swells within the pore spaces, bitumen and water will be displaced out of those pores.

A summary of three hot water-CO$_2$ runs conducted to investigate the effect of carbon dioxide concentration and temperature on bitumen recovery is shown in Table 2.

TABLE 2

| Summary of Hot Water-CO$_2$ Runs | | | | | | |
|---|---|---|---|---|---|---|
| Prod. Temp. °C. | CO$_2$ mole % | Weight of Oil Sand (gm) | Pre-Run analysis wt. % | | | Packing Density (gm/cc) | % Rec. |
| | | | Bit. | Water | Sand | | |
| 135 | 1.2 | 4028 | 14.1 | 1.2 | 84.4 | 1.9 | 48 |
| 100 | 1.2 | 3983 | 15.1 | 1.0 | 83.9 | 1.9 | 35 |
| 100 | 1.2–3.0 | 4026 | 14.3 | 1.3 | 84.2 | 1.9 | 53 |

Figure 6:
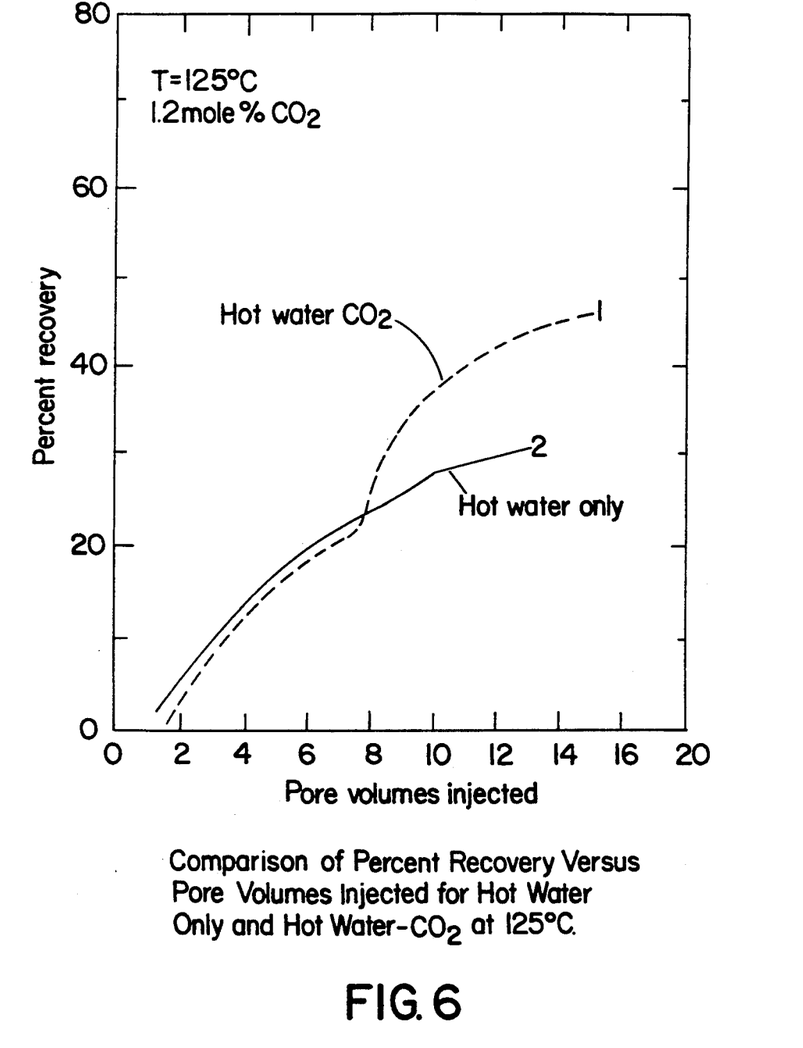

Curve 1 in FIG. 6 displays the effect of injecting carbon dioxide with hot water in such a way that free carbon dioxide, beyond that in solution, would be present in the core during the run. To compare the performance of carbon dioxide against that of hot water, the run was started by injecting hot water only for the first 8 PV. When the hot water-only injection was completed, a bitumen recovery of 22% of the initial bitumen was obtained. By adding carbon dioxide in hot water, a substantial increase in the rate of recovery was noticed and bitumen recovery was doubled after injecting about 5 PV. The pressure drop across the core increased from 200 kPa before carbon dioxide injection to 350 kPa when carbon dioxide injection started. By the end of the run, a total of 17 PV were injected and a recovery of 47% of the initial bitumen in place was obtained. Most of the bitumen recovered was in the form of W/O emulsion. The production temperature stabilized at an average value of 130° C.

A comparison of the recovery curves from the hot water-CO$_2$ and hot water-only injection is also made between curves 1 and 2 in FIG. 6. The improvement in the rate and ultimate recovery by adding carbon dioxide over that from hot water alone can be seen. The maximum percent oil cut in produced fluids was 3% for hot water-only and 5.9% for hot water-CO$_2$ indicating improvement in bitumen mobilization by adding carbon dioxide to hot water. Comparison of the hot water only portions of curves 1 and 2 indicates good experimental reproducibility.

Figure 7:
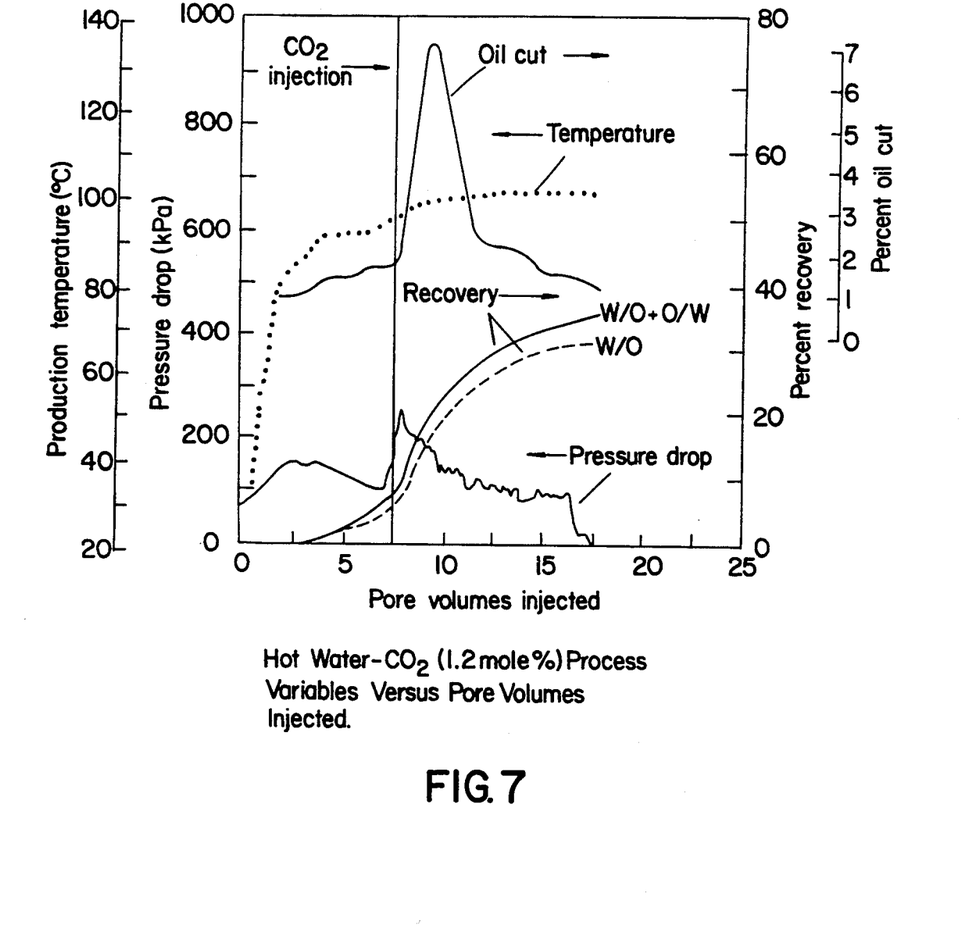
FIGS. 7 and 8 graphically illustrate the effects of certain process variables in the practices of this invention involving hot water and $CO_2$ injection.

FIG. 7 displays the process variables for a constant carbon dioxide concentration in hot water (1.2 mole%) at a low production temperature of 100° C. For the first 7.5 PV, neutral pH water was injected. During the initial heating of the communication path, 2.5 PV, no bitumen was produced and the pressure drop across the core and production temperature were increasing. After 2.5 PV of injection, bitumen production commenced at a production temperature of about 90° C. and was in the form of W/O emulsion. The oil cut was less than 1% at the end of the neutral pH water injection, 10% of the initial bitumen was recovered and the pressure drop declined form 160 kPa to 100 kPa.

After the injection of 7.5 PV of hot water, 1.2 mole% CO$_2$ was co-injected with the hot water until the run was concluded. When carbon dioxide was co-injected, the pressure drop increased from 100 kPa to 260 kPa. The production temperature remained at about 100° C. and the oil cut increased from 1% to 6.5%. The oil cut declined rapidly to about 1% after 3.8 PV of hot water-carbon dioxide injection and this was associated with a decline in the pressure drop from 300 kPa to 150 kPa. Most of produced bitumen was in the form of W/O emulsion. This run produced 35% of the initial bitumen in place. When carbon dioxide injection was stopped at the end of the run, the pressure drop decreased from 100 kPa to about 30 kPa indicating that free carbon dioxide was contributing to at least 70 kPa of the pressure drop.

Figure 8:
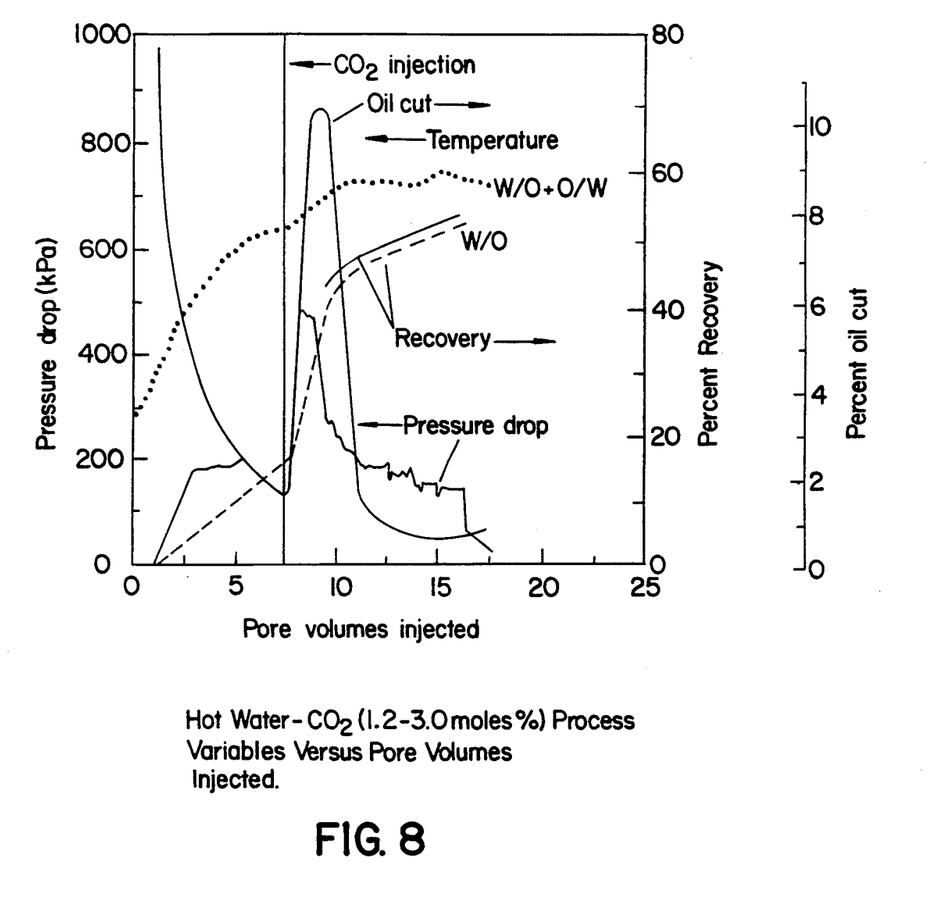

The results from an experiment where the pressure drop was maintained during the initial stage of carbon dioxide injection by gradually increasing the carbon dioxide flow rate from 1.2 mole% to a maximum rate of 3 mole%, then the carbon dioxide injection rate held constant at 3 mole% to the remainder of the run, are shown in FIG. 8. The preheating period of the communication path lasted for the first 1.3 PV of neutral pH water injection. During that period, no bitumen was produced and the pressure drop and production temperature were increasing. When the production temperature reached 100° C., bitumen started to be produced in the form of W/O emulsion. At the end of neutral pH water injection, 7.5 PV, a bitumen recovery of about 20% of the initial bitumen in place was obtained. This high initial recovery was the result of a higher pressure drop across the core than that for the previous runs. The increased pressure drop was believed to be the result of cold bitumen being squeezed into the communication path before the run. After 7.5 PV of neutral pH water injection, when the production temperature was about 105° C. and the pressure drop was 150 kPa, carbon dioxide injection at 1.2 mole % of 1.5 PV following the start of carbon dioxide injection in order to keep the pressure drop approximately constant. The oil cut increased from 2% before carbon dioxide injection to about 10% during the variable carbon dioxide injection period. After 9 PV, the carbon dioxide injection rate was kept constant at 3 mole% to the end of the run. The oil cut decline continuously following the fixed rate of carbon dioxide injection. The production temperature was constant at about 105° C. By the end of the run, 53% of the initial bitumen was recovered. Most of the recovered bitumen was in the form of W/O emulsion.

The run demonstrated that maintaining the pressure drop by increasing the carbon dioxide injection rate resulted in increasing bitumen mobilization and displacement and oil cut. Initial injection of 3 mole% $CO_2$ would have resulted in a much higher increase in pressure drop which might have cased plugging.

DISCUSSION OF EXPERIMENTAL RESULTS

All experimental runs made with pH of 10.5 or 11.5 produced mostly O/W emulsion with oil cuts ranging form 2% to 3% and oil recoveries ranging from 35% to 55% of the initial oil in place. The build up of the pressure drop across the core occurred very gradually after caustic injection which indicates that the residence time of the mobile oil in the core was not sufficient to acquire the maximum possible oil cut. It is believed that the process could achieve much higher oil cuts under field conditions and could be most attractive where a low pressure process is required.

The run made with a pH of 13.3 at a production temperature of 125° C. produced W/0 emulsion with a maximum oil cut of 7.6%. The produced fluids contained a large amount of dissolved solids and it would therefore not be practical to consider this for field application. However, the high oil cut and recovery (51%) that were obtained with a relatively low pressure drop.

All constant injection rate hot water-$CO_2$ runs produced mostly W/O emulsion with oil cuts up to 26% and recoveries ranging form 35% to 48%. The best bitumen recovery was achieved when the produced fluid temperature was around 130° C. When the produced fluid temperature was 100° C., 35% recovery was obtained which was better than the hot water alone.

The last hot water-carbon dioxide run was done at a production temperature of 100° C. while the carbon dioxide injection rate was gradually increased from 1.2 to 3 mole% during the first hour of carbon dioxide injection. The oil cut increased to a maximum of 10% and a recovery of 53% of the initial bitumen in place was obtained. The run was made to demonstrate the additional recovery that can be achieved by adding additional $CO_2$ to counter the decline in pressure drop due to the enlargement of the mobile fluid cross section.

CONCLUSIONS

1) The two hot water-additives caustic and $CO_2$ processes efficiently displaced bitumen with produced fluid temperatures ranging from 150° C. down to 100° C. and bitumen recoveries up to 60%.

2) All bitumen was produced either was W/O or as O/W emulsion.

3) O/W emulsion formation in the hot communication path is an essential step in the recovery process. The type of emulsion produced is controlled by the pH of the mobile fluid in the path. i.e. the produced O/W emulsion is unstable and quickly forms the observed W/O emulsion where fluid pH is neutral or acidic.

4) With the flow rate held constant, the pressure drop across the core decreases as the low bitumen saturation communication path enlarges by emulsification and transport of bitumen out of the core.

5) A first step toward dynamic recovery process control was made where the $CO_2$ injection rate was gradually increased from 1.2 to 3 mole% over a one hour interval and maintained at the higher rate for the remainder of the runs. Improved recovery resulted without pressure drop rising unduly as the $CO_2$ injection rate increased.

6) The hot water-caustic process produced O/W emulsions when the pH of produced fluids is between 10, and 11.5 but appears to work best when the temperature is above 150° C.

The practices of this invention include not only the injection of hot water and/or low quality steam and caustic (NaOH) and the injection of hot water and/or low quality steam and $CO_2$, but also the sequential injection of the above, either water and NaOH followed by steam or water and $CO_2$, or vice versa, and the combination of steam and/or water and NaOH and $CO_2$.

The disclosures of the reference cited herein and the above identified patent application are herein incorporated and made part of this disclosure.

As would be apparent to those skilled in the art, many substitutions and modifications are possible and would suggest themselves to those skilled in the art in the light of this disclosure.

What is claimed is:

1. A method of producing heavy crude oil or tar sand oil or bitumen from an underground formation containing the same which comprises utilizing or establishing an aqueous fluid communication path within and through said formation between an injection well or conduit and a production well or conduit which comprises introducing into said formation within said communication path via said injection well or conduit an aqueous stream comprising hot water and carbon dioxide, continuing the injection of said aqueous stream into said underground formation along said communication path and recovering or producing from said formation via said production well injected aqueous stream, together with heavy crude oil or tar sand oil or bitumen, said recovered aqueous stream being at a temperature of about 130° C.

2. A method in accordance with claim 1 wherein said aqueous stream is introduced at a temperature at least about 30° C. higher than the temperature of the produced aqueous stream.

3. A method of producing heavy crude oil or tar sand oil or bitumen from an underground formation containing the same which comprises utilizing or establishing an aqueous fluid communication path within and through said formation between an injection well or conduit penetrating said formation and a production well or conduit penetrating said formation, which comprises introducing into said formation within said communication path via said injection well or conduit an aqueous stream comprising hot water, aqueous caustic NaOH and carbon dioxide, continuing the injection of said aqueous stream into said formation along said communication path and recovering or producing from said formation via said production well the injected aqueous stream, together with heavy crude oil or tar sand oil or bitumen, at a temperature of about 130° C.

4. A method in accordance with claim 3 wherein said injected aqueous stream is introduced into said formation at a temperature of at least about 30° C. higher than the temperature of the produced aqueous stream.

5. A method of producing a heavy crude oil or tar sand oil or bitumen from an underground formation containing the same, which comprises utilizing or establishing an aqueous fluid communication path within and through said formation between an injection well and a conduit penetrating said formation and a production well or conduit penetrating said formation, which comprises introducing sequentially into said formation within said communication path via said injection well or conduit an aqueous stream of hot water and aqueous NaOH, followed by the introduction into said formation of an aqueous stream comprising hot water and carbon dioxide and recovering or producing from said formation via said production well the injected aqueous stream, together with heavy crude oil or tar sand oil or bitumen at a temperature of about 130° C.

6. A method in accordance with claim 5 wherein said aqueous streams are introduced into said formation at a temperature of at least about 30° C. higher than the temperature of the produced aqueous stream.

7. A method of producing heavy crude oil or tar sand oil or bitumen from an underground formation containing the same, which comprises utilizing or establishing an aqueous fluid communication path within and through said formation between an injection well or conduit penetrating said formation and a production well or conduit penetrating said formation, which comprises introducing sequentially into said formation within said communication path via said injection well or conduit an aqueous stream comprising hot water and carbon dioxide, followed by the injection of an aqueous stream comprising hot water and aqueous caustic NaOH and recovering or producing from said formation via said production well the injected aqueous streams at a temperature of about 130° C.

8. A method in accordance with claim 7 wherein said aqueous streams are introduced into said formation at a temperature of at least about 30° C. higher than the temperature of the produced aqueous streams.

* * * * *